United States Patent [19]

Watanabe et al.

[11] Patent Number: 5,233,332
[45] Date of Patent: Aug. 3, 1993

[54] PAGE TURNING EFFECT GENERATING APPARATUS

[75] Inventors: Osamu Watanabe, Tokyo; Shinsuke Koyama, Chiba, both of Japan

[73] Assignee: Sony Corporation, Tokyo, Japan

[21] Appl. No.: 655,154

[22] Filed: Feb. 13, 1991

[30] Foreign Application Priority Data

Feb. 16, 1990 [JP] Japan .................................. 2-35729

[51] Int. Cl.⁵ .............................................. G09G 1/06
[52] U.S. Cl. ................................... 340/724; 340/723; 340/734; 358/183; 395/127
[58] Field of Search .................... 358/182, 183, 160; 340/734, 723, 724, 726; 395/125, 127

[56] References Cited

U.S. PATENT DOCUMENTS

| 4,682,217 | 7/1987 | David et al. | 395/125 X |
| 4,751,660 | 6/1988 | Hedley | 395/125 |
| 4,831,445 | 5/1989 | Kawabe | 358/160 |
| 4,860,217 | 8/1989 | Sasaki et al. | 340/723 X |
| 5,053,762 | 10/1991 | Sarra | 358/183 X |

FOREIGN PATENT DOCUMENTS

186206 7/1986 European Pat. Off. .
2119594 11/1983 United Kingdom .
2212360 7/1989 United Kingdom .

Primary Examiner—Jeffery A. Brier
Assistant Examiner—Jick Chin
Attorney, Agent, or Firm—Lewis H. Eslinger; Jay H. Maioli

[57] ABSTRACT

A page turning effect generating apparatus for video signals is provided with a memory for storing a video signal, an output switch for switching incoming video signal and a memory output video signal in accordance with a switching control signal, and a control signal generator including a circuit for generating the switching control signal and a circuit for generating a read address to be supplied to the memory, wherein the read address generating circuit includes a convertor for non-linearly converting a first vector which represents one of the vector components of a vector expressing a scanning point of a display image from an origin of a modification, and a generator for generating a final vector by synthesizing the non-linearly converted first vector and a second vector which represents another of the vector components of the vector, the final vector indicating the read address to be supplied to the memory.

4 Claims, 9 Drawing Sheets

PAGE TURNING EFFECT GENERATING APPARATUS

BACKGROUND OF THE INVENTION

1. Field of the Invention

The present invention relates to a page turning effect generating apparatus for video signals.

2. Description of the Prior Art

As methods of changing over a video image (video screen) from an image A to an image B, there are generally known dissolve, cut-out and cut-in, wipe and so on, while a page turning method is used as a special image change-over method.

Figure 1A:
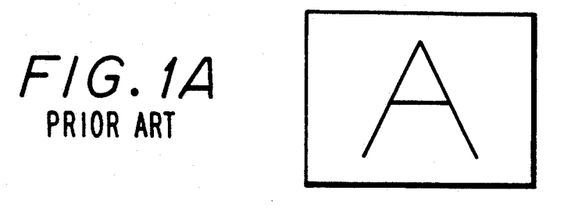
FIGS. 1A to 1E are schematic diagrams sequentially showing a page turning process.
Figure 1B:
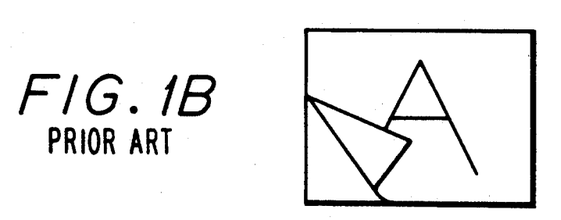
Figure 1C:
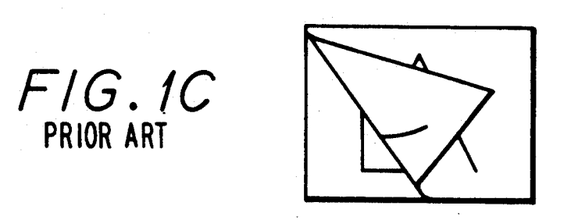
Figure 1D:
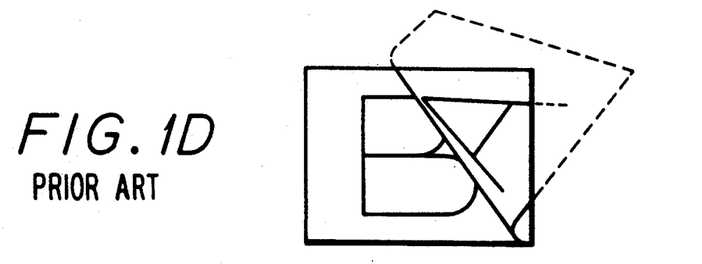
Figure 1E:
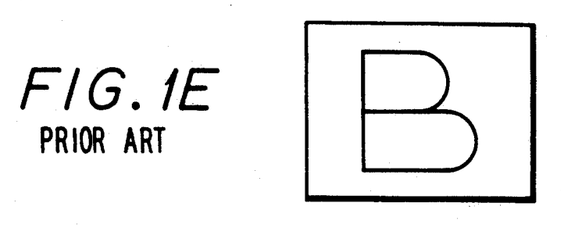

The page turning method is performed such that an image A is first displayed, as shown in FIG. 1A, the image A is then gradually replaced by an image B as if a page of a book is being turned over, as shown in FIGS. 1B to 1D, and finally the image B is displayed as shown in FIG. 1E. In this event, a portion out of the image A being turned over which is outside the screen shown in FIG. 1D (shown by a phantom line) is not naturally displayed. Further, as shown in FIGS. 1B to 1D, a turned portion of the image A is displayed in reverse, and a bent portion formed by the page turning is displayed as being deformed into a cylindrical shape (non-linear).

Figure 2:
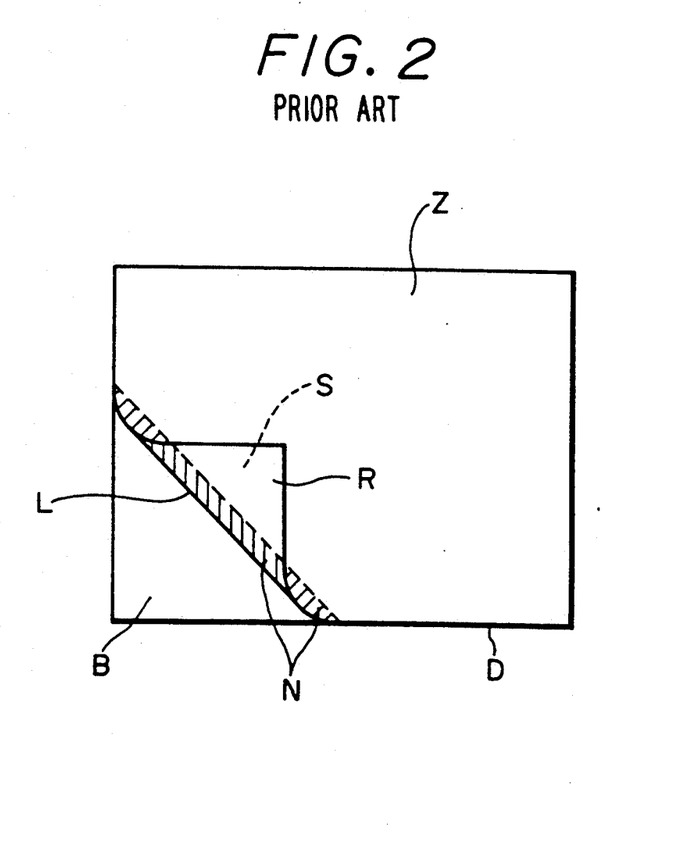
FIG. 2 is a schematic diagram used for explaining portions on a display screen.

In the explanation below, respective portions will be designated by the following names which are also shown in FIG. 2, as occasions arise:

Display screen D: An overall image displayed on a screen of a display;

Previous image A: An image which is to be erased by a page turn-over;

Remaining portion Z: A portion of the previous image A which is not yet erased;

Next image B: An image which is to appear by a page turn-over.

Reverse portion R: A portion of the previous image A which is being reversely displayed by a page turn-over;

Edge L: An edge for turning the previous image A (a border between the next image B and the reverse portion R);

Nonlinear portion N: A portion of the remaining portion Z and the reverse portion R which is deformed as being nonlinear or cylindrical in the vicinity of the edge L (a portion indicated by hatching); and Hidden portion S: A portion of the previous image A which is hidden by the reverse portion R.

Incidentally, in order to obtain page turning effects as mentioned above, image data of the remaining portion Z, image data of the reverse portion R and the image data of the next image B are necessary. Among the image data, as to the next image B, when a scanning position on the displayed screen D arrives at the next image B, image data at that position is merely outputted as it is as image data on the next image B. Such processing may be performed likewise for the remaining portion Z except for the nonlinear portion N.

However, in the nonlinear portion N, it is necessary to modify the order of the image data of the previous image A to a nonlinear or cylindrical form. Also, in the reverse portion R except for the nonlinear portion N, it is necessary to modify the order of the image data of the previous image A, though in a linear form.

For this reason, image data necessary for the nonlinear portion N has been conventionally derived by linearly writing image data of the previous image A into a video memory as well as generating nonlinearly changing read address signals by a cylindrical address generating circuit.

The above configuration for deriving nonlinear image data, nevertheless, requires a very complicated and expensive cylindrical address generating circuit. Also, the configuration allows little freedom relative to the shape (apparent shape in cross-section) of the nonlinear portion N when the reverse portion R is turned over. Therefore, the hardware configuration must be modified for producing the nonlinear portion N in a shape other than a cylindrical shape, for example an involved shape.

Further, since read addresses are generated separately for the portions N and R and the portion Z, the address generating method is complicated, which results in reduced freedom relative to the image changing processing. The configuration becomes further complicated when performing other page turning effects, for example, transferring the edge L in a fan shape simultaneously with a page turn-over.

Furthermore, there is little compatibility of hardware with other page turning effect generating circuits, for example, a three dimensional rotation effect generating circuit.

OBJECTS AND SUMMARY OF THE INVENTION

Accordingly, it is an object of the present invention to provide an improved page turning effect generating apparatus which can eliminate the aforenoted shortcomings and disadvantages of the prior art.

More specifically, it is an object of the present invention to provide a page turning effect generating apparatus which is capable of eliminating the above-mentioned problems inherent to conventional apparatus, i.e., a complicated configuration, little freedom, little compatibility and so on.

As an aspect of the present invention, a page turning effect generating apparatus for video signals comprises a memory for storing video signals, an output switch for switching incoming video signals and memory output video signals in accordance with a switching control signal, a control signal generating circuit including a device for generating the switching control signal, and a device for generating a read address to be supplied to the memory. The read address generating circuit includes a device for non-linearly converting a first vector which represents one of the vector components of a vector expressing a scanning point of a display image from an origin of a modification, and a device for generating a final vector by synthesizing the non-linearly converted first vector and a second vector which represents another of the vector components of the vector, the final vector indicating the read address to be supplied to the memory.

The above and other objects, features, and advantages of the present invention will become apparent from the following detailed description of illustrative embodiments thereof to be read in conjunction with the accompanying drawings, in which like reference numerals represent the same or similar parts.

BRIEF DESCRIPTION OF THE DRAWINGS

FIGS. 4 to 7B are schematic diagrams used for explaining page turning processing according to the invention;

DESCRIPTION OF THE PREFERRED EMBODIMENTS

Now, an embodiment of the present invention will hereinafter be described with reference to the accompanying drawings.

Figure 3:
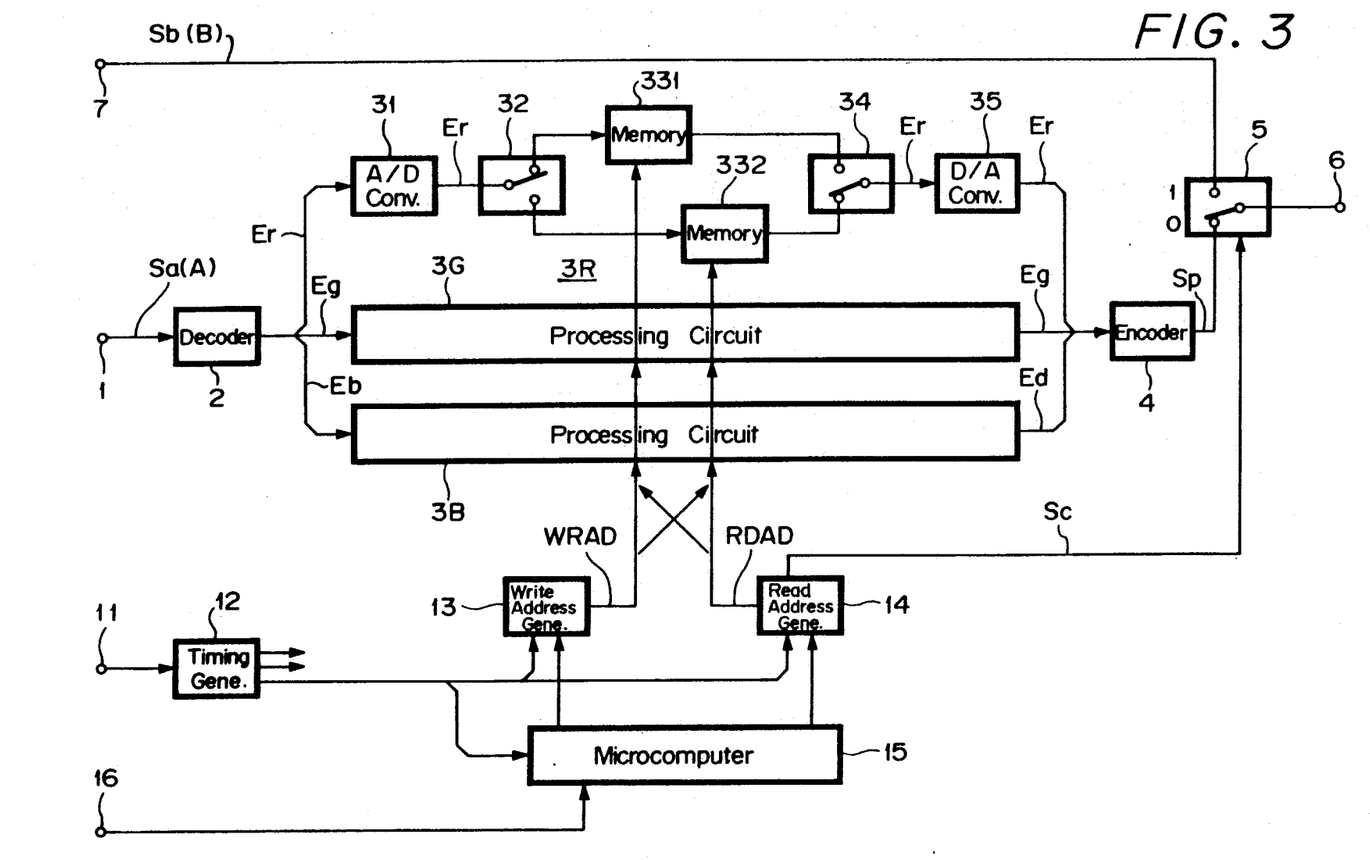
FIG. 3 is a systematic block circuit diagram showing an overall arrangement of a first embodiment of the apparatus according to the invention.

FIG. 3 shows the whole circuit arrangement of a first embodiment of the page turning effect generating apparatus according to the present invention. In FIG. 3, vertical and horizontal synchronizing pulses serving as references, a burst signal and a clock signal are supplied through a terminal 11 to a timing generator 12 which generates a variety of signals in synchronism with the supplied signals and supplies the same to respective circuits constituting the apparatus described later.

A microcomputer 15 sets a page turning speed and so on and starts page turning processing upon receiving a start signal from a terminal 16.

In the page turning process, first a color video signal Sa of a previous image A is supplied through a terminal 1 to a decoder 2 where three primary color signals Er, Eg, and Eb respectively representing red, green and blue are decoded, and the signal Er is supplied to a processing circuit 3R.

In the processing circuit 3R, the signal Er is supplied to an A/D (analog-to-digital) converter 31 to be converted to a digital red signal Er which is alternately supplied to field memories 331, 332 through a switching circuit 32 in every field period. A write address generating circuit 13 receives a signal from the timing generator 12 and then generates a write address signal WRAD for each sample of the signal Er which is supplied to one of the memories 331, 332. The write address signal WRAD is then supplied with the signal Er alternately in every field period.

The memories 331, 332 in this embodiment are composed of so-called V-RAMs wherein a scanning position of the signal Sa corresponds to an address. More specifically, assuming that horizontal and vertical coordinates of a scanning position are represented by (xm, ym), the write address WRAD indicates a write address (xm, ym) corresponding to the scan position coordinates (xm, ym).

Thus, the signal Er is written into the memories 331, 332 alternately in every field period, and sequentially in a one sample by one sample manner in a dot image.

A read address generating circuit 14 generates a read address signal RDAD which is changed in a manner later referred to. The signal RDAD is supplied to one of the memories 331 or 332 in which a write is not being performed alternately in every field period. Thus, the signals Er representing a remaining portion Z and a reverse portion R are alternately read out of the memories 331, 332 in every field period. These signals are then supplied through a switch circuit 34 to a D/A (digital-to-analog) converter 35 to be converted to analog signals, and then delivered to an encoder 4.

Processing circuits 3G, 3B, constructed in a manner similar to the processing circuit 3R, are respectively supplied with the signals Eg, Eb which are processed in a manner similar to the signal Er and supplied to the encoder 4.

In the encoder 4, the signals Er, Eg, Eb are encoded to generate a color video signal Sp representing the remaining portion Z and the reverse portion R which in turn is supplied to a switch circuit 5.

Also, a color video signal Sb representing a next image B is supplied to the switch circuit 5 through a terminal 7, while a signal Sc which becomes "1" during a displayed period of the next image B is supplied from the generating circuit 14 to the switch circuit 5 as a control signal thereof.

The signals Sp and Sb are then selectively derived from the switch circuit 5 in accordance with the signal Sc, and a color video signal for the page turning process is delivered to a terminal 6.

Next, a read method or procedure for the memories 331 and 332 will be explained with reference to FIGS. 4 to 7.

(1) Upon turning over a page, the position of the edge L may be changed in every field period or every integer-time period thereof and may not be changed within one field period.

Figure 4:
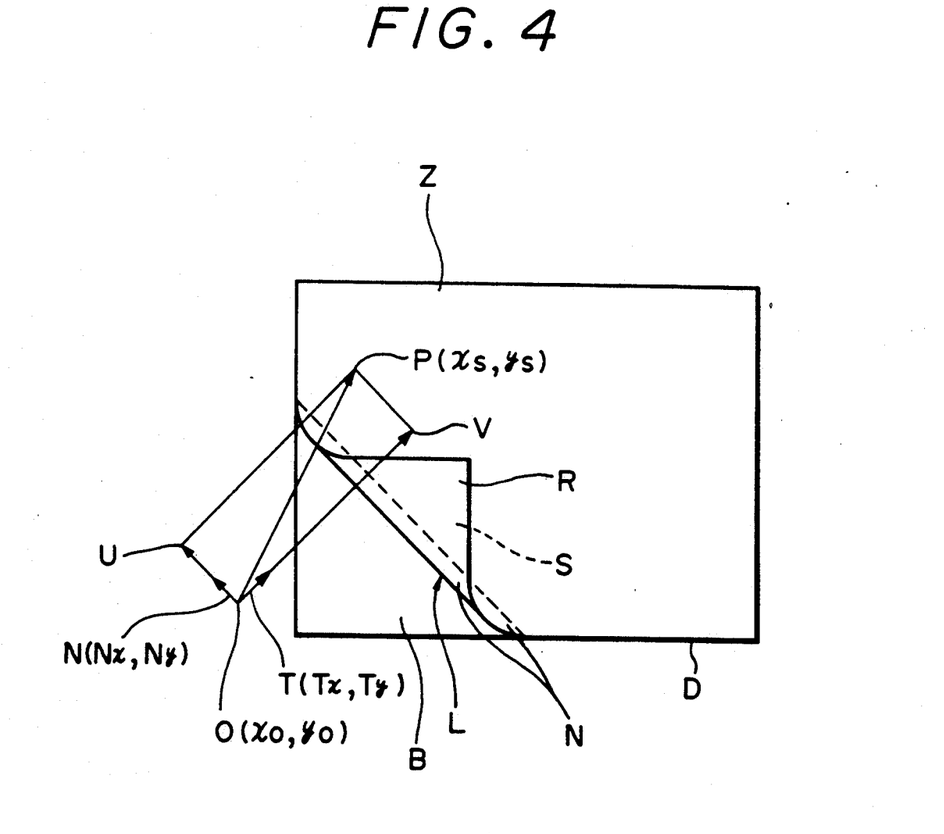

Assuming, as shown in FIG. 4, that:

P: an arbitrary point (a scanning point or a pixel) on the displayed screen D in an arbitrary field period;

O: an arbitrary point which is the origin of a page turning over; and $\overline{OP}$: a vector from the origin O toward the point P; the following vectors are calculated:

$\overline{OU}$: a component vector of the vector $\overline{OP}$ in a direction parallel to the edge L; and $\overline{OV}$: a component vector of the vector $\overline{OP}$ in a direction perpendicular to the edge L or a page turning over direction.

Figure 5A:
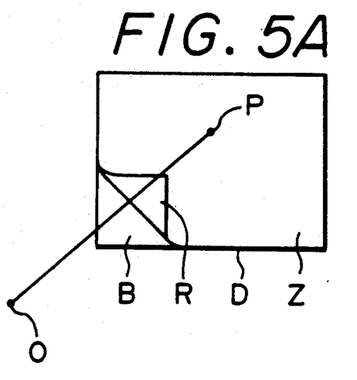
Figure 5B:
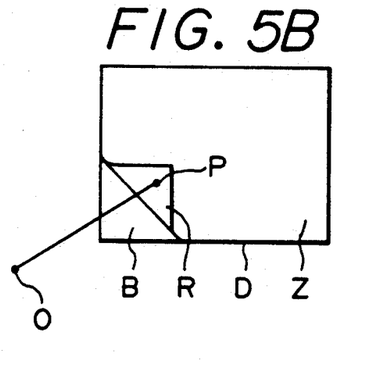
Figure 5C:
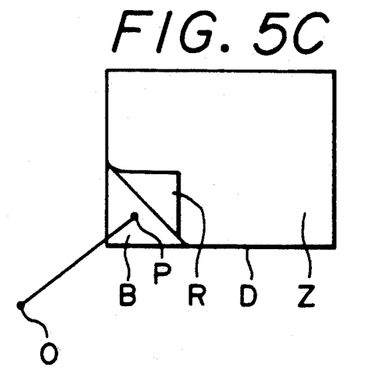

As shown in FIGS. 5A to 5C, a scanning position or a position of the point P is located in either the remaining portion Z (FIG. 5A), the reversed image R (FIG. 5B) or the next image B (FIG. 5C) in a field period in which a page is being turned. It should be noted, however, that in this event the position of origin O is not changed regardless of the position of the point P in the same field period.

Figure 6A:
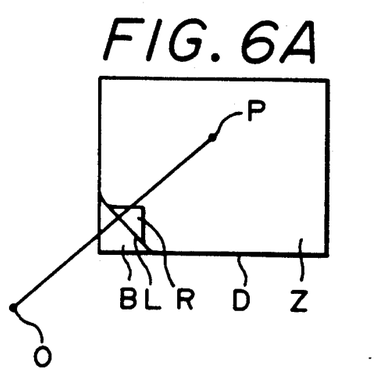
Figure 6B:
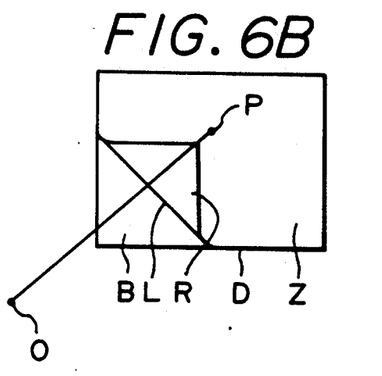
Figure 6C:
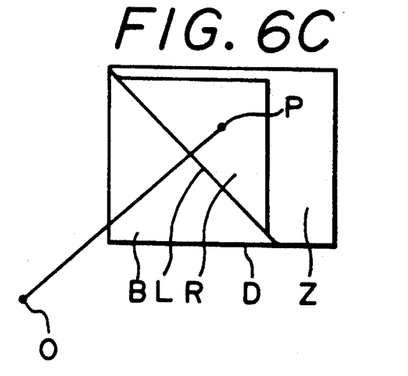

However, as shown in FIGS. 6A to 6C, if the field periods are different even with the point P remaining at the same position, the position of the origin O is changed once in every predetermined field period in the direction of the vector $\overline{OV}$ corresponding to a page turning speed. In other words, the length between the origin 0 and the edge L in the direction of the vector $\overline{OV}$ is constant.

(2) Next, with a magnitude or length OV of the vector $\overline{OV}$ being an input, the magnitude OV is converted to a predetermined value OW, for example, with reference to a look-up table memory.

In this event, when the point P is located on the remaining portion Z (except for the case where the point P is located on the nonlinear portion N) as shown in FIG. 5A, OW=OV stands.

Figures 7A, 7B:
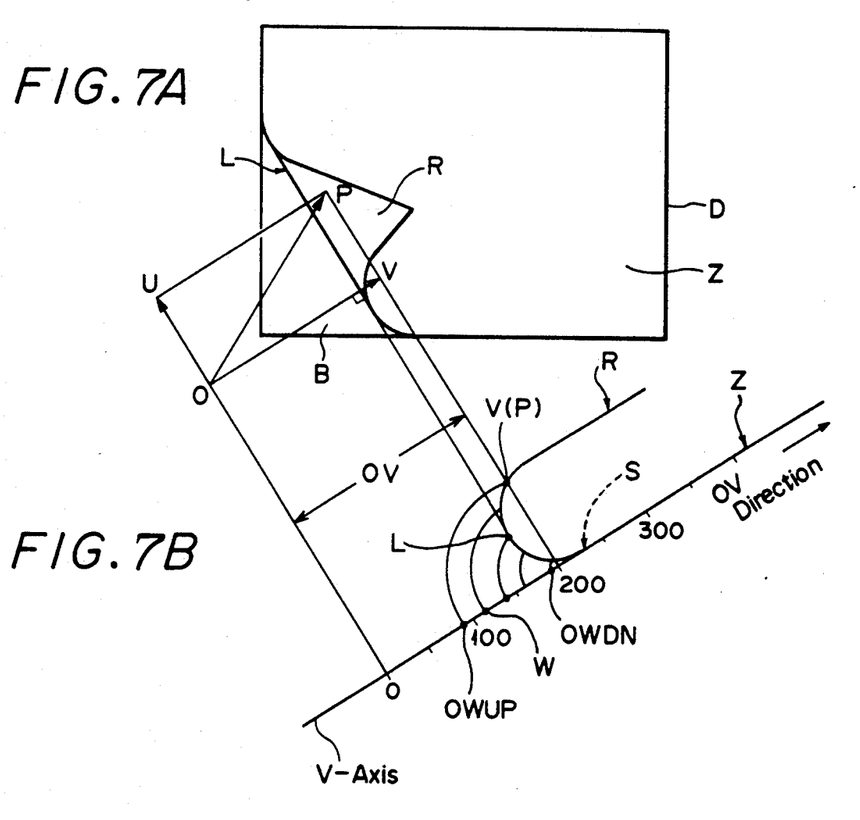

However, when the point P is located on the reverse portion R or the nonlinear portion N as shown in FIG. 4; the value OW (FIG. 7B) is a value corresponding to the transformation. More specifically, a v axis is assumed to be a coordinate axis provided by projecting the vector $\overline{OV}$ in parallel, as shown in FIG. 7. Also, supposing that the reverse portion R is solid, the cross-section of the reverse portion R taken along the v-axis direction is as shown in FIG. 7B. It should be noted, however, that values in FIG. 7B are included as comparisons for facilitating understanding and therefore are not correct.

Then, conversions are performed as follows:
when OV=200, OW=90;
when OV=180, OW=115;
when OV=173, OW=140 (with L);
when OV=178, OW=160;
when OV=198, OW=190

Note, the values OW in the upper half belong to the reverse portion R, while those in the lower half belong to the hidden portion S.

Stated another way, when the coordinate (=OV) of the point V on the v-axis is converted to the coordinate (=OW) on the v-axis before the reverse portion R is turned over, this converted value is equal to the value OW.

Incidentaly, the values OW include one converted from the magnitude OV of the reverse portion R and one converted from the magnitude OV of the hidden portion S. To distinguish these two values from each other, the former, that is, the value OW converted from the magnitude of the reverse portion R is designated OWUP while the latter, that is, the value OW converted from the magnitude OV of the hidden portion S is designated OWDN.

(3) The values OWUP, OWDN calculated in Paragraph (2) are regarded as vectors in the direction of the vector $\overline{OV}$, and the following vector composing is carried out:

I. The vector $\overline{OU}$ is vector synthesized with the value OWUP to obtain the coordinate of a point Pu based on the origin O as the origin; and II. The vector $\overline{OU}$ is vector synthesized with the value OWDN to obtain the coordinate of a point Pd based on the origin O as the origin.

In the above vector synthesis, if the original point P is located on the remaining portion Z (except for the nonlinear portion N), OWUP (=OW)=OV stands, so that the position of the point Pu is coincident with the position of point P.

Alternatively, if the point P is located on the reverse portion R, the point Pu, is positioned within the display screen D.

Further, if the point P is located on the next image B, the points Pu, Pd are positioned outside the display screen D.

Then, the processing of the following paragraph (4) is carried out on the basis of the positions of the points Pu, Pd.

(4) Read addresses for the memories 331, 332 are generated by performing the following processing from the coordinates of the points Pu, Pd:

I. When the point Pd is located within the display screen D, the coordinates of the point Pd are designated as a read address irrespective of the position of the point Pu;

II. When the point Pd is located outside the display screen D, and the point Pu is located on the display screen D, the coordinate of the point Pu is designated as a read address; and III. When the point Pd is located outside the display screen D, and the point Pu is also located outside the display screen D, read outs from the memories 331, 332 are not performed. Instead, the video signal Sb representing the next image B is fetched.

The above-mentioned reading method for the memories 331, 332 can be explained by using equations in the following manner.

Assuming that (xs, ys) designate the coordinates of the point P on the display screen D, $(x_0, y_0)$ designate the coordinate of the origin O, $N(Nx, Ny)$ is a unit vector in the direction of the vector $\overline{OU}$, and $T(Tx, Ty)$ is a unit vector in the direction of the vector $\overline{OV}$, the magnitude n of the vector $\overline{OU}$ (=OU) and the magnitude t of the vector $\overline{OV}$ (=OV) are given by the following equations:

$$n = Nx(xs-x_0) + Ny(ys-y_0) \quad \text{(i)}$$

$$t = Tx(xs-x_0) + Ty(ys-y_0) \quad \text{(ii)}$$

Then, further assuming that reference characters $t_1$, $t_2$ designate results of nonlinearly transforming the magnitude t, where $t_1$=OWUP and $T_2$=OWDN, then horizontal and vertical read addresses xm, ym (constituting a read address signal RDAD) for the point P in the memories 331, 332 are given by the following equations:

$$xm = x_0 + Txt_1 + Nxn \quad \text{(iii)}$$

$$ym = y_0 + Tyt_1 + Nyn \quad \text{(iv)}$$

Next, substituting the equation (i) for the equations (iii), (iv), xm and ym are given by the following equations:

$$xm = Txt_1 + Nx^2xs + NxNyys + Ny^2x_0 - NxNyy_0 \quad \text{(v)}$$

$$ym = Tyt_1 + NxNyys + Ny^2ys - NxNyx_0 + Nx^2y_0 \quad \text{(vi)}$$

Further assuming:

$$X = Nx^2xs + NxNyys + Ny^2X_0 - NxNyy_0 \quad \text{(vii)}$$

$$Y = NxNyxs + Ny^2Ys - NxNyx_0 + Nx^2y_0 \quad \text{(viii)}$$

the above equations (v), (vi) are expressed as follows:

$$xm = Txt_1 + X \quad \text{(ix)}$$

$$ym = Tyt_1 + Y \quad \text{(x)}$$

The above procedure is likewise applied to the value $t_2$.

For providing a simple page turning effect or a page turning effect for moving the edge L at a constant speed in the same direction, the values Nx, Ny, Tx, Ty in the above equations (vii) to (x) are constant. The values $x_0$, $y_0$, on the other hand, vary corresponding to a page turning speed in every field period or every integer multiple period thereof.

While the values xs, ys vary corresponding to the horizontal and vertical scans, they may be incremented by one corresponding to the scans, or they may be accummulatively added.

Figure 8:
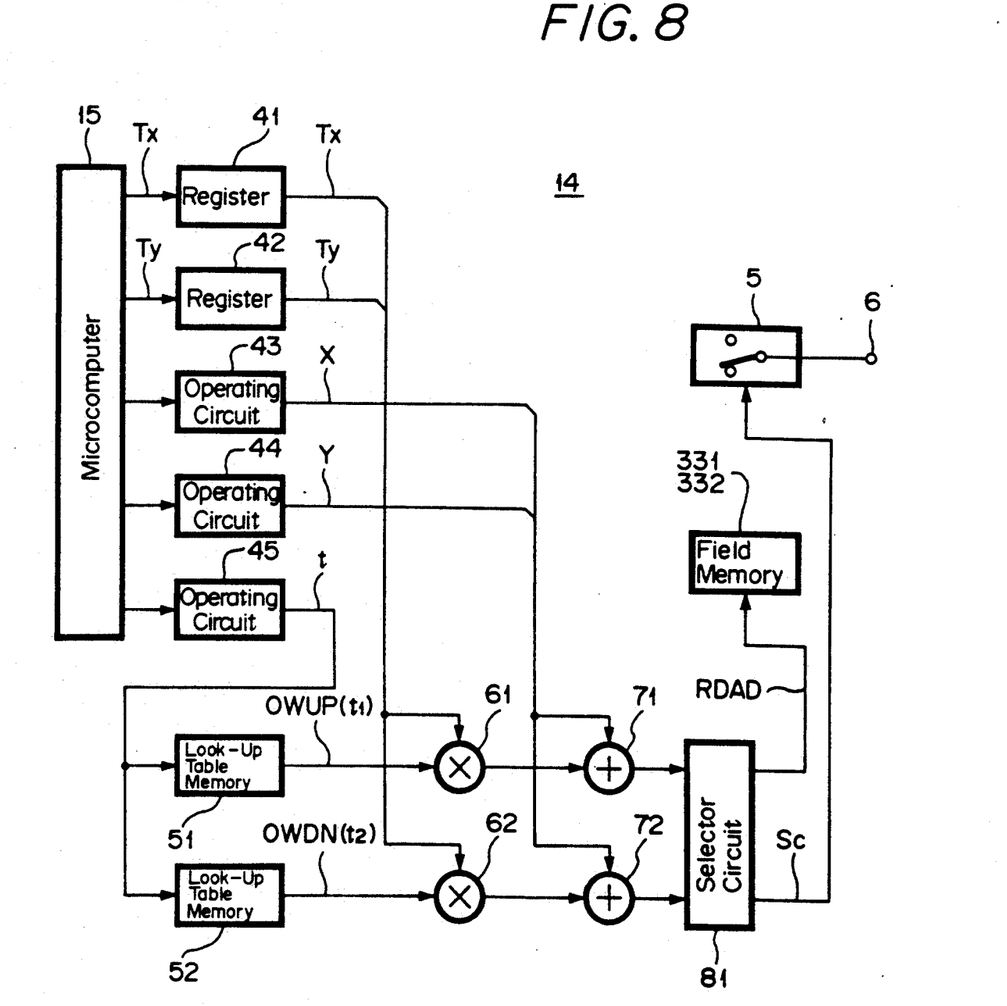
FIG. 8 is a block circuit diagram showing a read address generating circuit of the first embodiment.

FIG. 8 shows an example of the read address generating circuit 14 implementing the above-mentioned algorithm.

Specifically, signals Tx, Ty representing the above-mentioned values Tx, Ty are fetched from the microcomputer 15 through buffer registers 41, 42. Signals representing the values Nx, Ny, $x_0$, $y_0$ are also supplied from the microcomputer 15 to operating circuits 43 to 45, while a clock signal and so on are supplied from the timing generator 12 to the operating circuits 43, 44 and 45 to generate signals X, Y, t respectively representing the values X, Y, t.

Then, the signal t is supplied to look-up tables 51, 52 to be converted to signals $t_1$, $t_2$ representing the values $t_1$, $t_2$, respectively. These signals $t_1$, $t_2$ are supplied to multiplier circuits 61, 62 which are also supplied with the signals Tx, Ty respectively from the registers 41, 42, whereby signals representing the values $Txt_1$, $Tyt_1$, $Txt_2$, $Tyt_2$ appearing in the foregoing equations (ix), (x) are generated from the multiplier circuits 61, 62. The signals $Txt_1$, $Tyt_1$, $Txt_2$, $Tyt_2$ are then supplied to adder circuits 71, 72 which are also supplied with the signals X, Y from the operating circuits 43 and 44, whereby address signals xm, ym corresponding to the value OWUP and address signals xm, ym corresponding to the value OWDN are generated and supplied to a selector circuit 81.

In the selector circuit 81, the addresses xm, ym corresponding to the value OWUP or OWDN are selected in accordance with sections I to III of the foregoing Paragraph (4) and supplied by the selector circuit 81 to the memories 331, 332 as read addresses. Further, the control signal Sc is fetched from the selector circuit 81 in accordance with sections I to III of Paragraph (4) and supplied to the switch circuit 5. Thus, from the terminal 6 coupled to the switch 5 emanates a color video signal for a page turning effect.

It is appreciated that the apparatus of the present embodiment is capable of generating color video signals for page turning effects without the necessity of a complicated and expensive cylindrical address generating circuit which has been needed for conventional apparatus.

Also, for modifying the shape (apparent shape in cross-section) of the nonlinear portion N for turning up the reverse portion R, data in the tables 51, 52 may be simply modified, which results in providing great freedom in the shape of the nonlinear portion N.

Further, the read addresses can be generated separately for the portions N, R and the portion Z, so that great freedom is also provided for image change-over processing. For example, if it is desired to move the edge L in a fan shape at the same time a page is turned over, it is sufficient to modify the values X, Y in every field period or every integer-multiple period thereof. In alternative examples, if a reduced image is to be superimposed on a page which is being turned over, a reduced next page B, which is being turned over, can be superimposed on the display screen D without difficulty.

The apparatus of the present embodiment further provides a high compatibility with other special effect generating circuits such as a three-dimensional rotation effect generating circuit.

Next, a second embodiment of the present invention will be explained with reference to FIG. 9.

Figure 9:
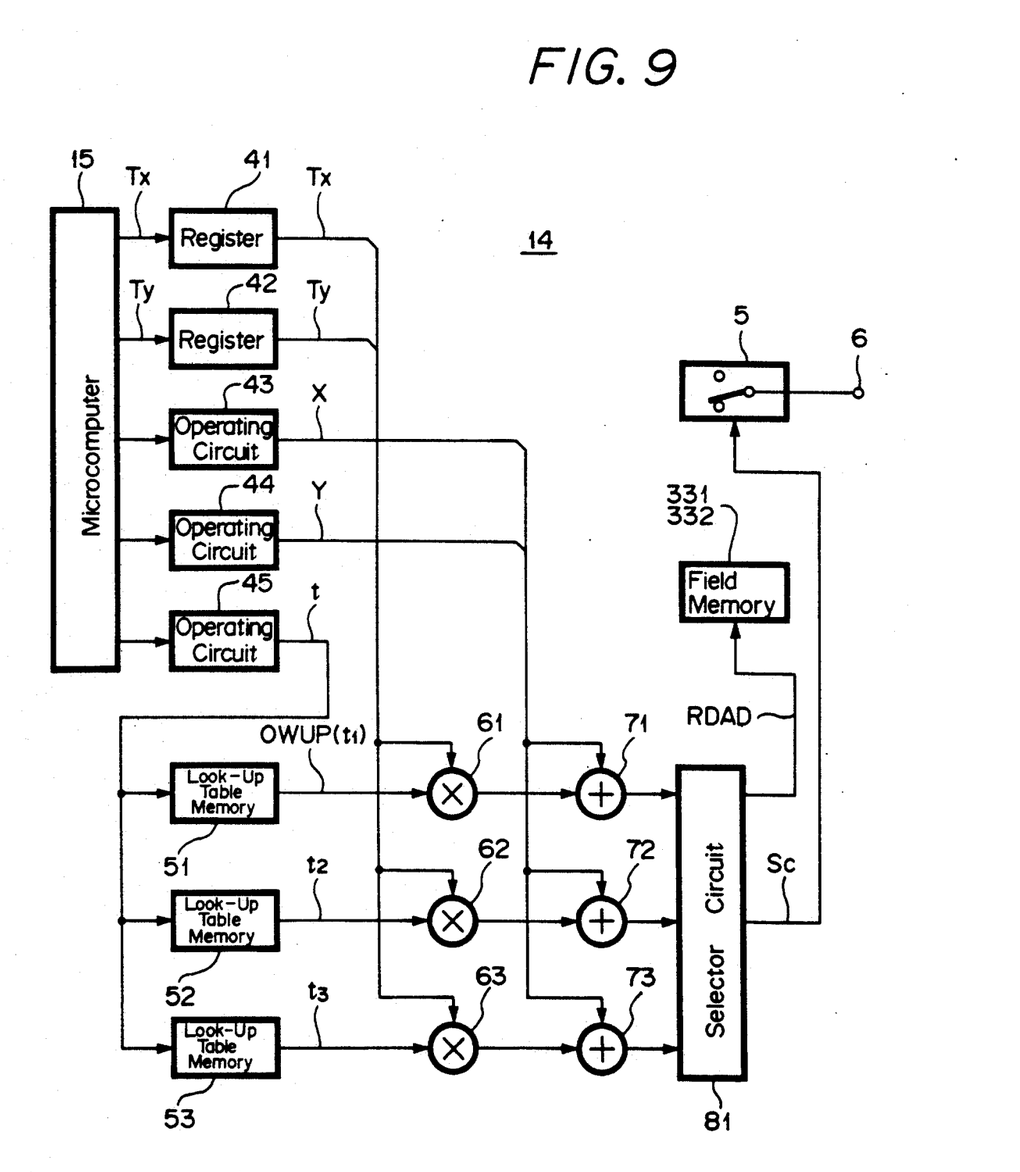
FIG. 9 is a block circuit diagram showing a read address generating circuit of a second embodiment.
Figure 10:
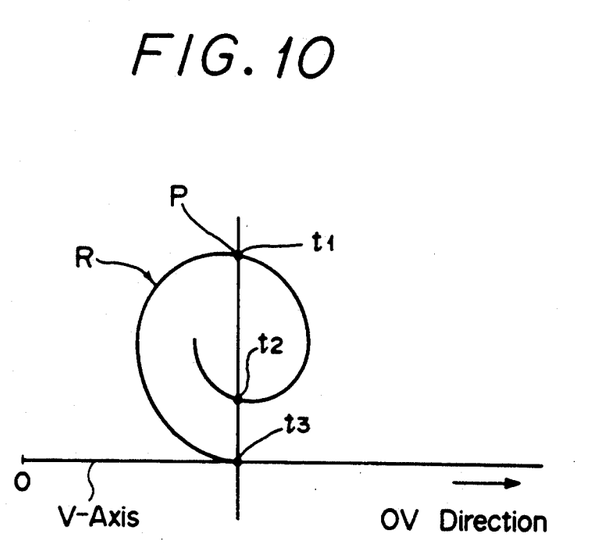
FIG. 10 is a schematic diagram used for explaining other page turning processing.

FIG. 9 shows an example of the circuit 14 which is used in a case where, when a previous image A is turned over, its reverse portion R is displayed so as to look as if it is involved, for example as the cross-section shown in FIG. 10. Explaining more specifically with reference to FIG. 10, when a point P is located on an involved portion, three values $t_1$, $t_2$ and $t_3$ are necessary for generating such a page turning effect. For this reason, a third look-up table memory 53 as well as a multiplier circuit 63 and an adder circuit 73 are provided for generating signals representing the foregoing equations (ix), (x) for the value $t_3$ which are supplied to the selector circuit 81.

The cross-section shape of the "turning page" can be made more complicated and effective by adding an operating circuit corresponding to a series circuit of the look-up table memory 53, the multiplier circuit 63 and the adder circuit 73, shown in FIG. 10. The look-up table memories 51, 52 may only contain data on the nonlinear portion N such that data on linear portions are calculated.

It should be further noted that for the previous image A, which is a still image, only one of the field memories 331, 332 is needed.

According to the present invention as described above, the page turning effect generating apparatus does not need a cylindrical address generating circuit, which results in avoiding a complicated configuration and high cost of the apparatus.

Also, for modifying the shape (apparent shape in cross-section) of the nonlinear portion N for turning over the reverse portion R, data in the tables 51, 52 may be simply modified, which is simple and results in providing great freedom in designing the shape of the nonlinear portion N.

Further, the read addresses can be generated separately for the portions N, R and the portion Z, so that great freedom is also provided for image change-over processing. For example, if it is desired to move the edge L in a fan shape at the same time a page is turned over, it is sufficient to modify the values X, Y in every field period or every integer-multiple period thereof. In alternative examples, if a reduced image is to be superimposed on a page which is being turned over, a reduced next page B, which is being turned over, can be superimposed on the display screen D without difficulty.

The apparatus of the invention further provides a high compatibility with other special effect generating circuits such as a three-dimensional rotation effect generating circuit.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention defined in the appended claims.

We claim as our invention:

1. A page turning effect generating apparatus for video signals comprising:

memory means for storing an image of an incoming video signal;

output switch means connected to an output of said memory means and to a next image of said incoming video signal for switching between the next image of the incoming video signal and the output video signal from said memory means in accordance with a switching control signal; and control signal generating means including means for generating said switching control signal and means for generating a read address supplied to said memory means, wherein said means for generating a read address includes means for nonlinearly converting a first vector that represents one vector component of a vector expressing a scanning point of a display image from an origin of modification, and means for generating a final vector by synthesizing said nonlinearly converted first vector and a second vector that represents another vector component of said vector expressing a scanning point of the image from the origin of modification, said first and second vectors being perpendicular to each other and said final vector indicating said read address supplied to said memory means.

2. The page turning effect generating apparatus of claim 1, wherein said read address generating means further comprises:

means for nonlinearly converting said first vector whereby said means for nonlinearly converting said first vector is adapted to convert said first vector, which is perpendicular to a page turning edge of said display image; and means for generating said final vector whereby said means for generating said final vector is adapted to generate said final vector by synthesizing said nonlinearly converted first vector, and said second vector, which is parallel to said page turning edge of said display image.

3. The page turning effect generating apparatus of claim 2, wherein said nonlinearly converting means includes look-up table memory means for nonlinearly converting said first vector whereby said nonlinearly converted first vector is synthesized with said second vector to generate said final vector.

4. The page turning effect generating apparatus of claim 3, wherein said nonlinearly converting means further comprises at least three look-up table memory means for nonlinearly converting said first vector.

* * * * *